United States Patent [19]

Nogle et al.

[11] Patent Number: 5,609,538

[45] Date of Patent: Mar. 11, 1997

[54] LUBRICATING DEVICE FOR A PLANETARY GEAR UNIT

[75] Inventors: Thomas D. Nogle, Troy; Steven A. Mikel, Farmington Hills; Berthold Martin, Shelby Township, Macomb County, all of Mich.

[73] Assignee: Chrysler Corporation, Auburn Hills, Mich.

[21] Appl. No.: 562,866

[22] Filed: Nov. 27, 1995

[51] Int. Cl.$^6$ ................................................. F16H 57/04
[52] U.S. Cl. .......................................................... 475/159
[58] Field of Search ................................ 475/159; 74/467

[56] References Cited

U.S. PATENT DOCUMENTS

| | | | |
|---|---|---|---|
| 2,408,336 | 9/1946 | Orr | 475/159 |
| 2,681,126 | 6/1954 | Searls | 475/159 |
| 2,877,668 | 3/1959 | Kelbel | 475/159 |
| 2,935,889 | 5/1960 | Adams et al. | 74/467 |
| 3,426,623 | 2/1969 | Abbott | 475/159 |
| 3,583,526 | 6/1971 | Mulleder et al. | 74/467 |
| 3,808,913 | 5/1974 | Gilbert et al. | 475/159 |
| 4,231,266 | 11/1980 | Nishikawa et al. | 74/467 |
| 4,848,177 | 7/1989 | Miura et al. | 74/467 |
| 4,955,852 | 9/1990 | Morisawa | 475/159 |

*Primary Examiner*—Dirk Wright
*Attorney, Agent, or Firm*—Kenneth H. MacLean

[57] ABSTRACT

For a planetary gear unit including several tubular pinion gear shafts which are located by a carrier member in a generally circular pattern, an oil delivery and lubricating assembly which includes plural plug and funnel members, the plug portions being inserted within the tubular pinion gear shafts which thereby orients the funnel member exteriorly of the shafts to intercept lubricating oil and deliver it to a bearing positioned about the pinion gear shaft.

6 Claims, 3 Drawing Sheets

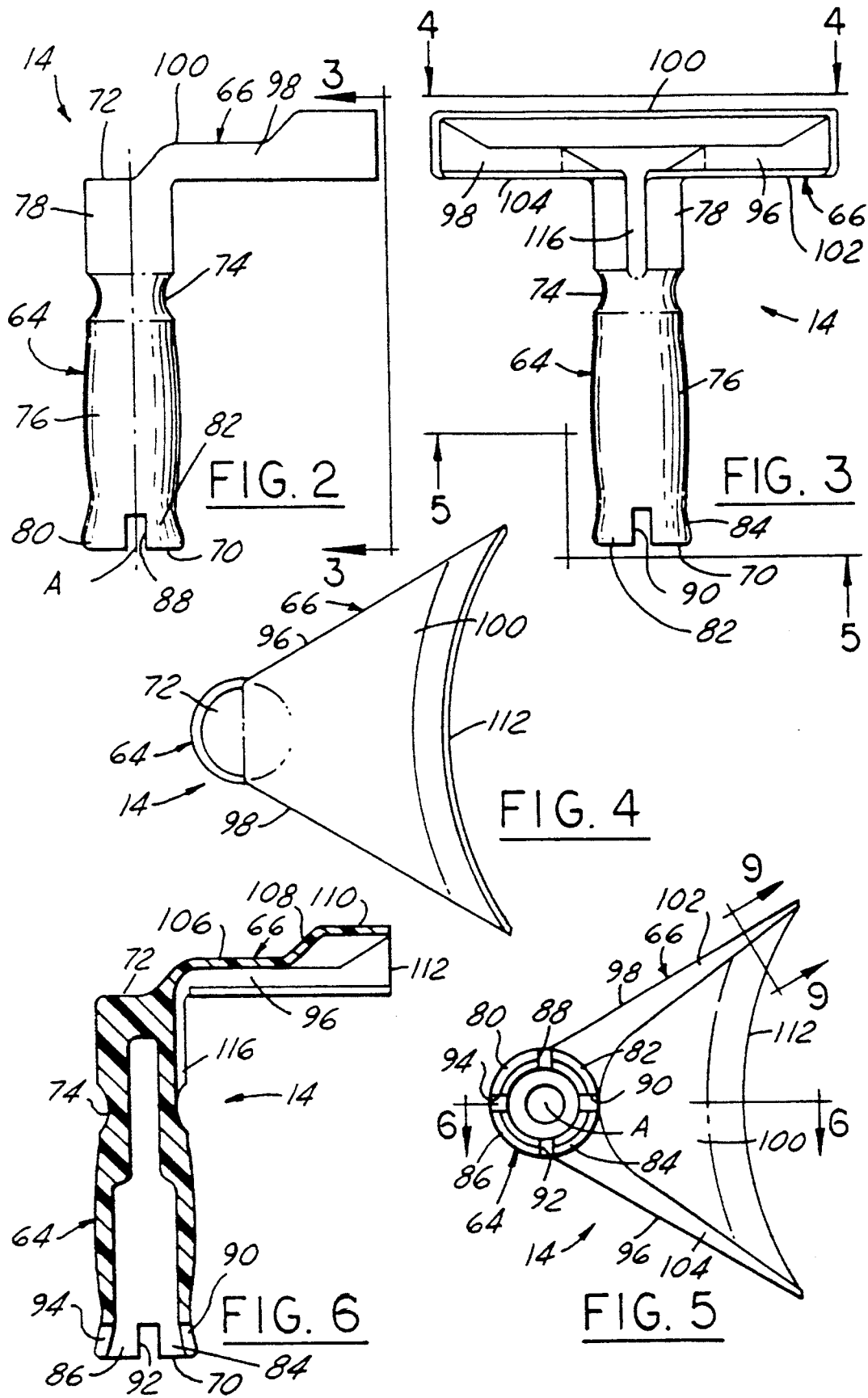

LUBRICATING DEVICE FOR A PLANETARY GEAR UNIT

For vehicle automatic transmissions or the like, this invention concerns planetary gear units and more particularly concerns a lubricating assembly for collecting oil and delivering oil to a bearing. The assembly includes several plug member portions each adapted to be inserted into the interior of a tubular pinion gear shaft. Each plug is configured with a funnel-configured end portion adapted to extend adjacent to the end of the pinion gear shaft to intercept flow of lubricating oil and deliver oil to bearings located about the pinion gear shaft.

BACKGROUND OF THE INVENTION

In the past, various types of lubricating oil feed devices have been provided in power transmissions to assure that the bearings and the clutch disks receive adequate oil during operation of the transmission. For example, U.S. Pat. No. 2,935,889, issued May 10, 1960 in the name of Adams et al. provides a baffle and tube arrangement for a friction clutch wherein oil contacting the baffle is directed to the tube and afterwards is moved by means of a coil spring to the clutch disks. Another form of an oil directing device for providing oil to a clutch, which in this case is a roller clutch, can be seen in U.S. Pat. No. 4,848,177 issued on Jul. 18, 1989 in the name of Miura et al. In the Miura et al. '177 patent, an oil infeed plate 32 is press-fitted onto the inner peripheral surface of a ring gear of a planetary gear unit. The Miura et al. infeed plate 32 in one form is L-shaped in cross section while in two other versions the infeed plate takes the form of a disk having projections and recesses to increase the oil infeed force for introducing lubricating oil to the roller clutch during rotation of the infeed plate.

In addition, U.S. Pat. No. 4,231,266 issued to Nishikawa et al. on Nov. 4, 1980 shows a power transmission unit provided with a protrusion on an inner wall of the housing that is splashed with lubricating oil pumped upwardly by rotation of an idler gear on the idler shaft with an oil receiver arranged under the protrusion to receive the oil dropping from the protrusion and direct it to an bearing of the idler shaft. Another patent disclosing a lubricating oil directing device is U.S. Pat. No. 4,955,852 issued to Morisawa on Sep. 11, 1990. The patent to Morisawa shows a generally annular lubricant receiver 204 secured to the carrier of a planetary gear unit and serving to direct oil to the bearing associated with planetary gears 60 and 62. Also, it will be noted that certain automobiles manufactured by Mitsubishi have a four-speed transmission identified as ATX(F4A42) that utilizes a lubricating oil directing device made of sheet metal. The Mitsubishi device is fixed to the carrier and is similar to the Morisawa device in that it is positioned around a longitudinally extending opening in the support shaft of the planetary gear and flares outwardly so as to provide a oil receiving portion for feeding the oil into opening of the support shaft.

Although the above described oil directing devices provide a means for feeding lubricating oil to various parts of a power transmission, one problem with the oil feed devices as seen in Nishikawa et al., Adams et al., and Mitsubishi is that separate fasteners (such as screws or rivets) are needed to allow them to maintain a fixed position relative to an adjacent part of the transmission. The Miura et al. oil directing device, and it appears the Morisawa device, do not use separate fasteners but instead has a peripheral portion thereof secured to an associated gear member by a press-fit operation. A problem with press-fits for securing one member to another is that it requires special tooling and tolerance considerations and therefore increases the assembly time of the members and cost of manufacture.

SUMMARY OF THE INVENTION

Accordingly, one object of the present invention is to provide a new and improved lubricating assembly for use with a planetary gear unit characterized in that the lubricating assembly consists of a plurality of interconnected funnel devices each of which is self-retained in the hollow central portion of a tubular pinion shaft and does not require any separate fasteners for maintaining it in a fixed position relative to an associated planetary gear.

Another object of the present invention is to provide a new and improved lubricating assembly for use with a planetary gear unit that permits the use of lower cost and lighter weight tubular pinion shafts for the pinion gear with which funnel portions of the lubricating assembly are associated.

A further object of the present invention is to provide a new and improved lubricating assembly for a planetary gear unit of a power transmission that includes a plurality of interconnected funnel devices, each funnel device associated with a tubular pinion shaft to channel oil effectively to the bearings of the pinion gear and also provides a seal within the tubular shaft of the pinion gear.

A still further object of the present invention is to provide a new and improved lubricating assembly for a planetary gear set of a power-transmission that is made of plastic material and does not require the use of separate oil seals.

The above objects and others are realized in accordance with the present invention by a lubricating assembly for use with a planetary gear unit which includes a sun gear having a plurality of pinion gears engaging the sun gear and supported by a pinion gear carrier. A ring gear engages the pinion gears each of which is supported on a tubular pinion shaft fixed with the carrier. The tubular pinion shaft has an opening formed therein along the longitudinal center axis of the pinion shaft that communicates with a port extending radially from the opening. A first bearing means is positioned between the pinion shaft and each of the pinion gears while a second bearing means is associated with the carrier for allowing rotation of the latter relative to the ring gear.

In the preferred form, the lubricating assembly is made of a plastic material and comprises a plurality of cylindrical plug members, one for each of the tubular shafts. The plurality of plug members are interconnected by flexible linking portions to permit insertion of each plug member into an open end of a tubular pinion shaft. In addition, each plug member has an annular groove surrounding its body portion that is adapted to be aligned with the port in the pinion shaft. Each plug member includes a funnel shaped end portion which is integrally formed with one end of the plug member. The funnel shaped portion is located exteriorly of the end of the pinion shaft in fixed relationship with the carrier. The plug member has its body circumferentially enlarged at the free end which first is inserted into the tubular pinion shaft so as to seal the associated end of the opening in the pinion shaft. Also, a channel is formed in the plug member at the other end thereof for connecting the funnel member with the groove of the plug member. The arrangement is such that lubricating oil passing through the second bearing associated with the carrier is fed in a radial direction by centrifugal force to the funnel portion and then flows via the channel in the plug member to the groove thereof and next through the port in the pinion shaft the first bearing associated with the pinion gear.

BRIEF DESCRIPTION OF THE DRAWINGS

The above objects, features and advantages of the present invention will be more fully understood from a reading of the following detailed description of the invention when taken with the drawings in which:

FIG. 2 is an elevational view of one of the lubricating devices seen in FIG. 1;

FIG. 3 is a view taken on line 3—3 of FIG. 2;

FIG. 4 is a view taken on line 4—4 of FIG. 3;

FIG. 5 is a view taken on line 5—5 of FIG. 3;

FIG. 6 is a sectional view taken on line 6—6 of FIG. 5;

DETAILED DESCRIPTION OF THE PREFERRED EMBODIMENTS

Figure 1:
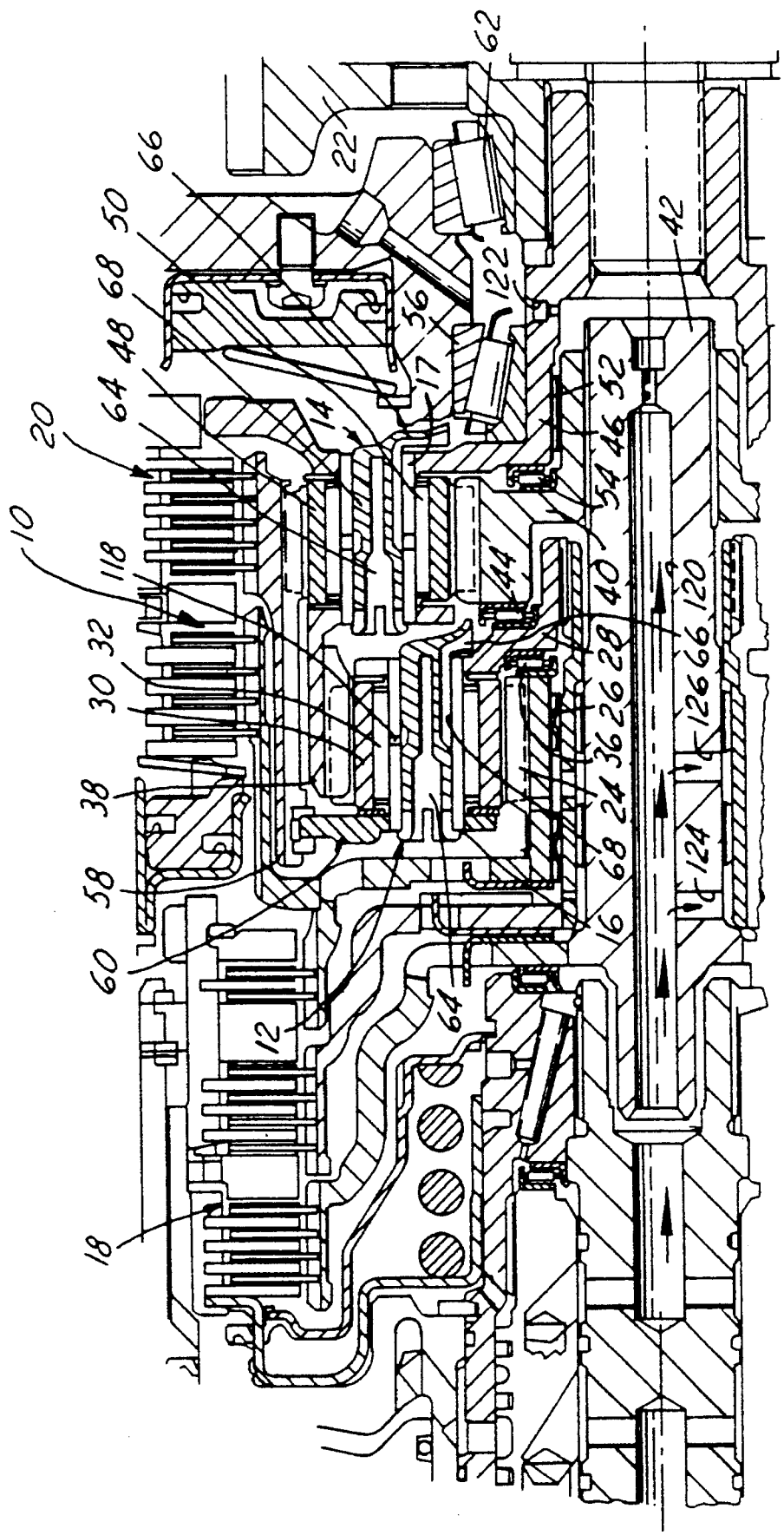
FIG. 1 is an elevational view of a part of the planetary gear unit of an automatic power transmission that incorporates lubricating devices made in accordance with the present invention.

Referring to the drawings and more particularly FIG. 1 thereof, a compound planetary gear unit 10 is shown forming a part of an automatic transmission which can be used in a vehicle such as an automobile. Although not shown, the transmission includes the usual torque converter assembly which is connected to a positive displacement pump assembly. As conventional, the pump assembly serves to supply pressurized oil flow to various assemblies of the transmission and serves to provide lubricating oil to the planetary gear unit as will be more fully described hereinafter.

Prior to proceeding with the description of the invention, it will be noted that the compound planetary gear unit 10 seen in FIG. 1 as well as other parts of the transmission shown are more fully shown and described in U.S. Pat. No. 4,871,887 to Nogle which issued on Oct. 3, 1989. Accordingly, reference is made to that patent for obtaining a more comprehensive understanding of the transmission and the operation thereof. The only difference between the transmission disclosed in the '887 patent and the corresponding part of the transmission disclosed in FIG. 1 is that the arrangement shown in FIG. 1 includes lubricating oil directing devices 12 and 14 incorporated with the planetary gear sets of the compound planetary gear unit. As seen, the lubricating devices 12 and 14 are located within tubular (hollow) pinion gear support shafts 16 and 17, respectively, according to the invention.

More specifically and with further reference to FIG. 1, the planetary gear unit 10 is operatively controlled by multi-clutch assemblies 18 and 20 which, depending upon which of the clutch members are applied and released, provide various drive ranges for the automobile. In other words, during the flow of power, the planetary gear unit 10 changes the ratio of torque between an input shaft and an output member such as output gear 22 which is drivingly connected to the drive wheels of the vehicle.

The compound planetary gear unit 10 includes a front planetary gear set and an axially spaced rear planetary gear set. The front planetary gear set includes a sun gear 24 supported upon bushings 26. A pinion gear carrier 28 is disposed about the sun gear 24 and includes a plurality of circumferentially spaced pinion gears (one of which is only shown and identified by reference numeral 30) each of which is rotatably supported by needle bearings 32 on the shaft 16 rigidly connected to the carrier 28. A thrust bearing 36 is provided between the sun gear and the carrier 28 and a ring gear 38 is disposed about the carrier 28 for engagement with the pinion gears 30.

The rear planetary gear set also includes a sun gear 40 with a center portion which is splined to a shaft 42 and supported in bushing portion 52 of the carrier 46. A thrust bearing 44 is provided between the planet carrier 28 and the sun gear 40. As in the case of the front planetary gear set, a pinion carrier 46 is disposed about the sun gear 40 and includes a plurality of circumferentially spaced pinion gears (one of which is only shown and indicated by reference numeral 48) each of which is rotatably supported by needle bearings 50 on the shaft 17 fixed to the carrier 46. The carrier 46 is splined to the output gear 22 which is supported by tapered roller bearings 62 mounted in the case. A thrust bearing 54 is disposed axially between the sun gear 40 and the carrier 46. Moreover, tapered roller bearings 56 supports the carrier 46 for rotation within the transmission housing.

It will be noted that the carrier 46 is fixedly connected to the ring gear 38. In addition, it will be noted that a ring gear 58 is disposed about the carrier 46 and engages in the usual manner the pinion gears 48. The ring gear 58 is connected to a portion 60 of the carrier 28 while the output gear 22, which is supported for rotation by a tapered roller bearing 62, is secured to the planet carrier 46.

As alluded to above, the cooperation between the multi-clutch assemblies 18 and 20 and the compound planetary gear unit 10 for providing various operating modes of the transmission is explained in detail in my '887 patent mentioned above. Accordingly, reference is made to that patent for a more complete understanding of the operation of both of these assemblies, the planetary gear unit 10, as well as the transmission as a whole.

As also mentioned above, the only difference between the planetary gear unit shown in the '887 patent and that shown in FIG. 1 is the provision of the lubricating oil devices 12 and 14 made in accordance with the present invention and located within the hollow pinion support shafts 16 and 17.

In this regard, it will be noted that each of the lubricating devices 12 and 14 shown is made of a plastic material and includes a hollow plug member or portion 64 integrally formed with a funnel member or portion 66. In each case, the lubricating device is located within a cylindrical opening 68 formed within the associated supporting pinion shaft. As will be more fully explained hereinafter, the two lubricating devices 12 and 14 shown function in the same manner, however, they do differ from each other in that the funnel member 66 of the lubricating device 12 is somewhat shorter in vertical length than the funnel member 66 of the lubricating device 14. It should be apparent that this difference in design is necessitated by the amount of clearance provided for the funnel member in each instance. This difference, however, will not vary the operation of either of the devices 12 and 14. Accordingly, the lubricating device 14 shall now be described in detail and it will be understood that the lubricating device 12 has the same identical parts except for the size of the funnel member 66.

More specifically and with reference to FIGS. 1–5, the plug member 64 of the lubricating device 14 has a body portion which is generally cylindrical in configuration and has a front end 70 and a back end 72. Intermediate the front end 70 and the back end 72 of the body portion, an annular groove 74 is provided which surrounds the body portion and is located in a plane which is normal to the center longitudinal axis A of the body portion. The groove 74 divides the body portion of the lubricating device into a front body section 76 and a rear body section 78. The front end 70 of the body portion of the plug member 64 is formed with four outwardly flared retainer members 80, 82, 84 and 86 which are defined by four circumferentially spaced slits 88, 90, 92 and 94 located in the front end 70 of the front body section 76. The outer peripheral edges of the retainer members 80–86 lie on a circle having a diameter greater than the diameter of the circle defining the outer periphery of the rear body section 78. It will be noted that the lubricating device 14 is intended to be made of a plastic material which will allow the retainer members 80–86 to flex radially inwardly when force is applied thereto and return to their normal positions as seen in FIGS. 1–5 when the force is relieved. It will also be noted that the front body section 76 is barrel-shaped so as to provide an enlarged sealing portion intermediate the retainer members 80–86 and the groove 74 formed in the body portion of plug member 64. At its crown, the outer periphery of the sealing portion of the front body section 76 will lie on a circle having a diameter slightly larger than the aforementioned diameter of the rear body section 78.

Figure 9:
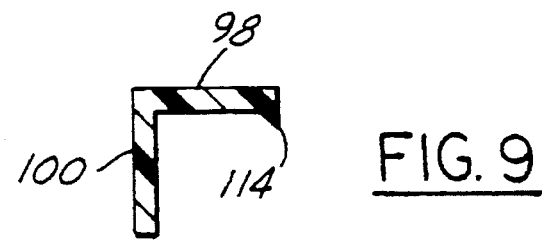
FIG. 9 is a sectional view taken on line 9—9 of FIG. 5 showing a portion of the funnel section of the lubricating device.

The funnel portion 66 which forms a part of the lubricating device 14 is integrally connected to the back end 72 of the plug portion 64. As best seen in FIGS. 4 and 5, the funnel portion 66 includes a pair of side walls 96 and 98 which taper outwardly from the plug member 64 and are integrally formed with a triangularly shaped back wall 100 and a pair of front walls 102 and 104 each of which is the mirror image of the other. As seen in FIG. 6, the back wall 100 has an upper portion 106 which lies in a plane normal to the longitudinal center axis A of the plug member 64 and connects with an outwardly flared portion 108 which, in turn, is connected to a lower depending portion 110 of the back wall 100. The depending portion 110 of the back wall 100 terminates with a curved edge 112 which lies on a circle having its rotational center at the center of the carrier 46. Moreover, the front walls 102 and 104, as seen in FIG. 5, are tapered in configuration gradually increasing in sized starting at the curved edge 112 of the back wall 100 and ending at the back end 72 of the plug member 64. Each of the front walls 102 and 104 is provided with an inwardly extending lip 114 as seen in FIG. 9 that extends along the length of the associated side wall starting at the curved edge 112 of the back wall 100 and ending at a channel 116 formed in the rear body section of the plug member 64. Thus, when the lubricating device 14 is assembled to the rear planetary gear set as seen in FIG. 1, all of the walls 96–104 cooperate with the carrier 46 to define an inlet chamber for the lubricating oil. As best seen in FIGS. 3 and 6, the inlet chamber of the funnel member 66 connects with the groove 74 formed in the body portion of the lubricating device 14 through the channel 116 formed in the rear body section 78. Also, note that the channel 116 is located along an axis which is parallel to the longitudinal center axis A of the plug member 64.

Referring now to FIG. 1 and as alluded to hereinbefore, the lubricating device 14 is shown incorporated with the rear planetary gear set of the compound planetary gear unit 10. In this regard, it will be noted that the support shaft 17 of the pinion gear 48 is fixed to the carrier 46 and has the cylindrical opening 68 formed therein the diameter of which is approximately the same as the diameter of the rear body section 78 of the plug member 64. The support shaft 17 has at least two radial ports 118 formed therein which are located in a plane extending transversely to the longitudinal axis of the shaft 17 for providing a passage between the opening in the shaft 17 and the needle bearings 50.

During assembly of the lubricating device 14 with the pinion gear support shaft 17, the retainer members 80–86 are initially bent radially inwardly so as to allow the front end 70 of the plug member 64 to enter the shaft opening 68 and be manually pushed into such opening. It will be understood that inasmuch as the outer peripheral diameter of the front body section 76 is slightly greater than the diameter of the rear body section 78, there will be an interference fit between the front body section 76 and the opening 68 as the plug member 64 is forcibly moved from the right end to the left end of the opening 68 as seen in FIG. 1. Once the end portions of the retainer members 80–86 are the beyond the left end of the opening 68 in the shaft 17, the retainer members 80–86 will spring back to their normal positions thus locking the lubricating device 14 in the opening 68. At the same time, the front body section 76 will seal the left end of the opening 68 because Of its interference fit with the inner surface of the opening 68, and the groove 74 formed in the plug member 64 will register with the ports 118 formed in the support shaft 17. In addition, the channel 116 cooperating with the inner surface of the opening 68 will form a passage communicating the inlet chamber of the funnel member 66 with the groove 74. Also, the front walls 102 and 104 will be in surface-to-surface contact with the carrier 46 so as to provide a substantially sealed inlet chamber in the funnel member 66 of the lubricating device 14. It will also be understood that each of the pinon gears 48 will have the plug member 64 positioned within the associated opening 68 in the support shaft 17 so that the curved edge 112 of the funnel member's back wall 100 will lie on a circle having its center at the center of the rotational axis of the carrier 46. The lubricating device 14 associated with each pinion gear 48 can be maintained in this position by having one or more molded projections formed on the outer surface of the front walls 102 and 104 which mate with appropriately positioned complementary holes (not shown) formed in the carrier 46.

In operation, oil originating at the pump of the transmission and flowing in the direction of the arrows (seen in FIG. 1) through the passage 120 formed in the shaft 42, has a portion thereof flowing through a port 122 in the carrier 46, through the bearing 56, to an area where the funnel member 66 of the lubricating device 14 is located. From this point, centrifugal force will then cause the oil to enter the inlet chamber of the funnel member 66 with the lips 114 formed with the front walls 102 and 104 assuring there is a tangential component of oil that flows into the channel 116 formed in the plug member 64. The oil will then be fed via the channel 116 to the groove 74 of the plug member 64 and into the ports 118 of the support shaft 17 to provide lubrication of the needle bearings 50.

Similarly, oil flowing through the shaft 42 will be fed through ports 124 and 126 as seen by the arrows, through the thrust bearing 44, into the area of the funnel member 66 of the lubricating device 12. As with the lubricating device 14, centrifugal force will cause the oil to enter the funnel member 66 of the lubricating device 12, flow into the channel of thereof, and then into the associate groove and port 118 of the support shaft 16 to provide lubricating oil to the needle bearings 32 associated with the pinion gears 30.

Figure 7:
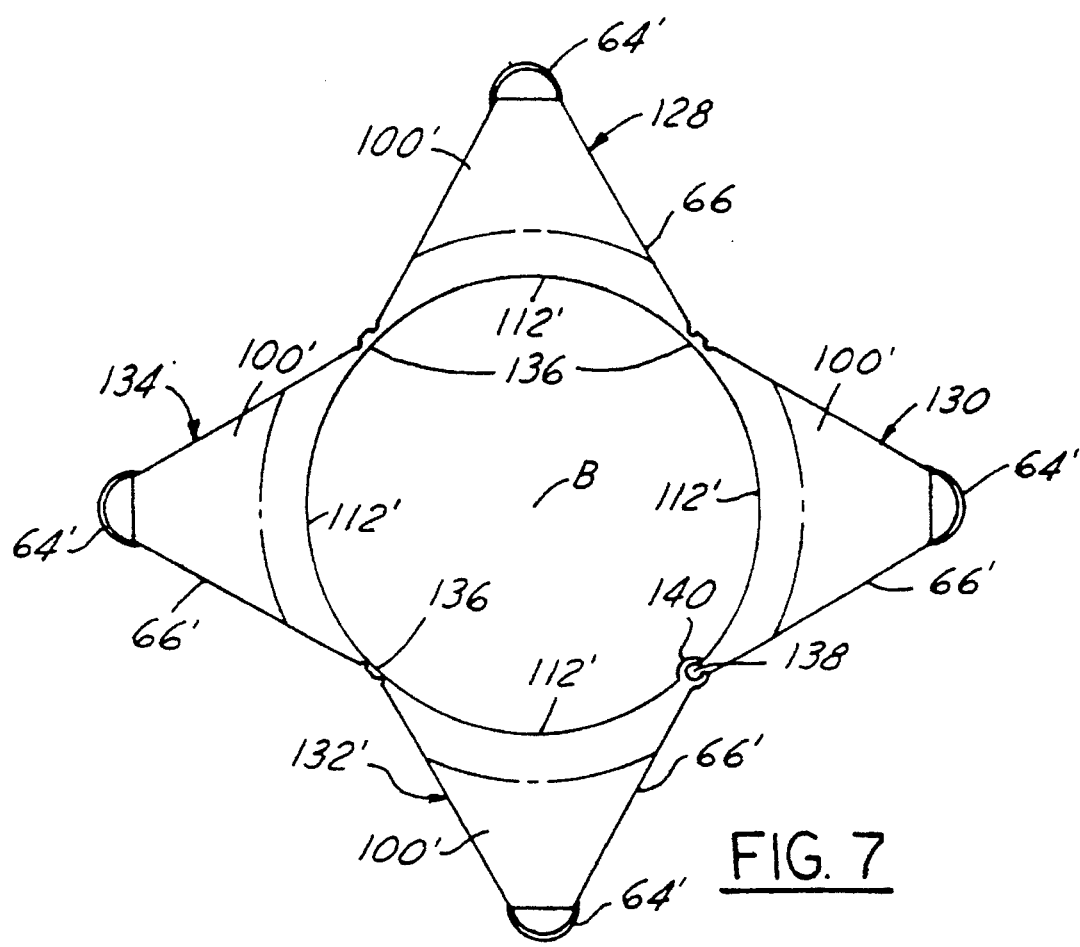
FIG. 7 shows the lubricating device as seen in FIGS. 2–5 integrally joined together in a circle with similar devices to form a unitary member which can be assembled to a planetary gear unit such as seen in FIG. 1.
Figure 8:
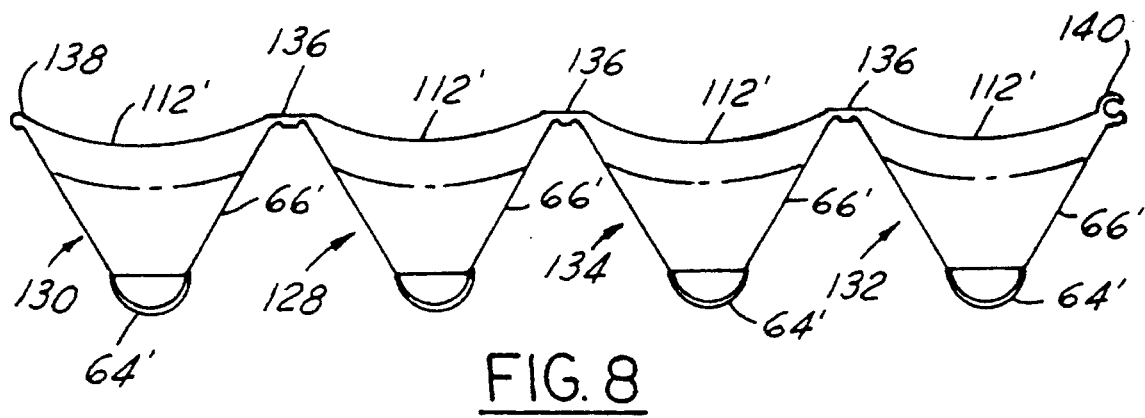
FIG. 8 shows the four lubricating devices of FIG. 7 as they would appear prior to joining them in the form of the circle as seen in FIG. 7.

FIGS. 7 and 8 show four lubricating devices 128, 130, 132, 134 (each of which is identical in construction to the lubricating device 14 seen in FIGS. 2–6) interconnected in a manner which would facilitate mounting of the lubricating devices 128–134 to a planetary gear set such as the rear set seen in FIG. 1. Note that parts of the lubricating devices 128–132 that are the same as the parts of lubricating device 14 are identified by corresponding reference numerals but primed.

As seen in FIG. 8, the lubricating devices 128–134 are molded so as to have adjacent sidewalls hinged together by a living hinge 136 with one sidewall of the device 130 provided with a ball type projection 138 while one sidewall of the devices 132 is provided with a socket 140 for accommodating the projection. Thus, by placing the ball projection 138 into the socket 140, the lubricating devices 128–134 assume the positions shown in FIG. 7 with the curved edges 112' of the back wall 100' of each of the lubricating devices 128–134 being located on a circle having its center common with the rotational center B of the carrier 46. It should be apparent that by having the lubricating devices 128–134 joined together, as seen in FIGS. 7 and 8, it would be a simple matter to quickly align the plug member 64' of each lubricating device 128–134 with the four support shafts 17 of the carrier 46, and insert the plug member 64' of each lubricating device into the accommodating opening 68 in the shaft 16 as explained above. Inasmuch as the funnel members 66' are interconnected by the living hinges 136, the plug member 64' in each pinion shaft 17 and, accordingly, the associated funnel member 66' will maintain its proper position relative to the carrier 46 without requiring any antirotation elements of the type described above in connection with the lubricating device 14.

Various changes and modifications can be made in the construction of the lubricating device described above without departing from the invention. Such changes and modifications are contemplated by the inventor and he does not wish to be limited except by the scope of the appended claims.

The embodiments of the invention in which an exclusive property or privilege is claimed are defined as follows:

1. An improved device for lubricating bearings located between pinion gears and support shafts in a planetary gear unit in which the support shafts are tubular with end openings and the shafts are supported by a carrier member, the support shafts having a port extending therethrough for passage of oil from the interior of the shaft to an encircling bearing, whereby the pinion carrier member arranges the shafts in spaced relationship about the rotative center of the planetary gear unit, the improved bearing lubrication device, comprising: a generally cylindrical plug for each support shaft and having an end configuration adapted to be insertable into an end opening of a support shaft; each plug having a funnel portion integrally formed on an opposite end portion of said plug member, said funnel portion having a fan shaped configuration and adapted to extend exteriorly of the support shaft in fixed relationship with the pinion carrier member whereby oil passing radially outwardly from the central portion of the planetary gear unit can be intercepted by said funnel portion; said plug member having a channel formed to guide flow of intercepted oil to the port in the shaft; means flexibly connecting adjacent funnel portions together forming a one-piece integral lubricating device.

2. The improved lubricating device set forth in claim 1 in which said funnel portions extend laterally away from the axis of a respective plug portion toward an adjacent funnel portion and an integral hinge portion flexibly connecting adjacent funnel portions.

3. The improved lubricating device as set forth in claim 2 in which the interconnected configuration is initially formed in a linear configuration leaving a pair of unattached opposite edges, and said opposite edges are brought together to form a circular configuration readily adaptable for simultaneous insertion of multiple plug portions.

4. The improved lubricating device as set forth in claim 3 in which one of said unattached edges is formed with a generally ball shaped configuration, and the other unattached edge is formed with a socket configuration adapted to attachingly engage said ball shaped configuration.

5. In a planetary gear unit including a carrier supporting pinion gear shafts with bearings thereabout, a unitary lubricating device to lubricate the bearings, the pinion gear shafts extending in substantial parallelism to one another and forming a circular arrangement with respect to the rotative center of the planetary gear unit so that during rotative operation of the planetary gear unit an outward flow of oil passes the open end portions of the tubular pinion gear shafts, said unitary lubricating device comprising: a plug member for each of the tubular pinion gear shafts, a first end portion of each plug member adapted to be insertably assembled into the interior of a tubular pinion gear shaft; a funnel-shaped member integrally formed on a second end portion of each plug member so that it is arranged exteriorly of the pinion gear shaft when said plug member is inserted into the interior of the pinion gear shaft and is in fixed relationship with the carrier, whereby lubricating oil passing outward toward said funnel member is intercepted and directed to said plug member; flow means of said plug member to conduct a flow of oil from said funnel member to the bearing; said unitary lubricating device made by providing integral living hinges to connect adjacent edge portions of side by side funnel members to form a linear configuration with opposite edge portions; means for attaching the opposite edge portions to form a circular configuration of plug and funnel members adapted to align with the open ends of the pinion gear support shafts so that said multiple plug members are simultaneously introduced into the interiors of the support shafts.

6. The improved lubricating device as set forth in claim 5 in which one of said opposite funnel edges is formed with a ball-like configuration, and the other of said opposite edges is formed with a socket configuration whereby said ball-like configuration is attachingly engaged by said socket configuration to form a generally circular, unitary, and multi-plug device.

\* \* \* \* \*